UNITED STATES PATENT OFFICE.

HUGH CALHOUN, OF HOT SPRINGS, AND ARON M. BEAM, OF BEAR, ASSIGNORS, BY DIRECT AND MESNE ASSIGNMENTS, TO THE UNITED STATES DESULPHURIZING, DRY-CHLORIDIZING, AND AMALGAMATING COMPANY, OF HOT SPRINGS, ARKANSAS.

METHOD OF EXTRACTING METALS FROM ORES.

SPECIFICATION forming part of Letters Patent No. 504,706, dated September 12, 1893.

Application filed April 1, 1891. Serial No. 387,275. (No specimens.)

*To all whom it may concern:*

Be it known that we, HUGH CALHOUN, residing at Hot Springs, in the county of Garland, and ARON M. BEAM, residing at Bear, in the county of Montgomery, State of Arkansas, citizens of the United States, have invented certain new and useful Improvements in Methods of Extracting Metals from Ores, of which the following is a specification.

This invention relates to the extraction of gold and silver, either or both, from that class of ores commonly known as "dry ores," which do not contain lead or its equivalent in quantity sufficient to form a flux; and it has reference particularly to such ores as contain the precious metals only in a state of minute division. Ores of this class are found in Arkansas, Mexico, New Mexico, Arizona, and elsewhere, and many attempts have been made to recover or extract the gold and silver from them,—but such efforts have generally failed to prove commercially successful, owing to the highly divided state in which the metals appear in the ores, and the effect produced by high temperatures, such as are necessary to effect fusion. To obviate this and other difficulties, very high temperatures are avoided in the process about to be described, and the gold, or gold and silver is or are caused to chemically combine with other elements and absorbed by or deposited in a body or substance which is subsequently burned away under an increase of temperature, but at a temperature considerably below that necessary to fusion of gold or silver. The materials used, and their relative proportions may, and advisably should be varied somewhat, according to variations in the ores treated, as will be explained after stating the usual or preferred procedure.

The materials employed in connection with the ore are: muriate of ammonia; carbonaceous matter, petroleum or charcoal being preferred; saw-dust; and borax. Of these several ingredients, the saw-dust may be omitted, and the borax is to be used only when the ores contain metals which are liable to oxidize, and to cause a film or coating of oxide to be deposited upon the gold or silver. The materials are first prepared by properly reducing the ore and the charcoal, if that form of carbon be selected, and by dividing or grinding the muriate of ammonia. The ore should be reduced sufficiently to pass through a screen of sixty meshes to the inch, and the charcoal to pass through a screen of ten meshes to the inch,—the muriate of ammonia being divided into as small particles as can conveniently be made. To one ton of ore thus prepared, there is added from one-half of one per cent. to one per cent. of charcoal; or from one and one-half to three gallons of petroleum, preferably in the crude state; and from one-half of one per cent. to one per cent. of the muriate of ammonia. If charcoal be used instead of petroleum, a quantity of saw-dust equal to that of the charcoal should be added, and this may be done when using petroleum, though not deemed necessary. If the ores are of a character to render it necessary to prevent the coating of the gold with oxide of other metals, borax should be added in the proportion of from two-tenths of one per cent. to one per cent.

All the proportions above stated are by weight, and are those that are deemed best for ordinary or average conditions; but the muriate of ammonia, the charcoal, and the saw-dust may vary in quantity, each, from about one-fourth of one per cent. to about two and a half or three per cent. of the weight of ore used. The batch being prepared by mixing the ingredients well and intimately together, it is placed in a roasting oven provided with suitable air inlet which at the outset should be at a low red heat or thereabout, and should be gradually raised as the roasting progresses. When a temperature of about 700° Fahrenheit is reached, the chlorine of the muriate of ammonia, acting upon the heated gold and silver of the ore, combines therewith, forming chloride of gold and chloride of silver. The chloride of silver remains unaffected in the presence of carbon, even under increase of temperature, but the chloride of gold is decomposed, the chlorine presumably combining with the carbon and producing chloride of carbon, while the gold is left free and in a measure aggregated. The temperature being raised, say to from 1,200° to 1,600° Fahrenheit, the carbonaceous matter is burned out, and the chlorine combined therewith is eliminated. The precise temperature at which the gold chloride is decomposed in this process is not definitely known, nor is it a matter of importance, it having been definitely ascertained that the several steps above recited, if performed in the manner stated, will produce the result set forth. When petroleum is employed, enough water should be used to moisten the whole pulp mass, previous to subjecting it to heat.

As a substitute or equivalent for the muriate of ammonia, we propose to employ the chloride or muriate of lime, this being preferable with ores containing silica, but not so good as the muriate of ammonia for ores devoid of silica. The purpose and action of the ammonia and the lime are the same, substantially. Ordinarily, the roasting should be continued from two to four hours, but these limits are not arbitrary. The entire operation is performed at temperatures considerably below the fusion points of gold or silver, and advisably not above 1600° Fahrenheit. After the roasting is completed and the gold and silver are brought to the metallic state and aggregated to greater or less extent, the usual process of amalgamation is resorted to, but as that forms no part of the present invention and is well understood, it need not be described herein. After discharging the reduced metals and gangue it is advisable, and sometimes it is necessary to treat the same with an ammonia solution to clean the metal and permit the quicksilver to act upon it.

The invention being thus described, what is claimed is—

1. The herein described method of chlorinating ores containing gold and silver, which consists in roasting the same in the presence of carbon and muriate of ammonia in substantially the proportions stated.

2. The herein described method of chlorinating and aggregating gold and silver from ores without a flux, which consists in subjecting the ores to heat in the presence of carbon and muriate of ammonia or its equivalent, and maintaining the temperature between a low red heat and the fusion point of the metal or metals to be extracted until the gold and silver become chlorinated.

3. The herein described mode of treating ores containing precious metal, which consists in reducing the ore to a granular or pulverulent condition,—mixing therewith muriate of ammonia and carbon in substantially the proportions stated, then roasting the mass, in presence of air increasing the heat as the roasting progresses, and thereby eliminating the carbon,—and finally amalgamating in the usual way.

In witness whereof we hereunto set our hands in the presence of two witnesses.

HUGH CALHOUN.
ARON M. BEAM.

Witnesses:
C. W. CUTTER,
J. F. PARKER.